(12) United States Patent
Cardona et al.

(10) Patent No.: US 9,333,129 B2
(45) Date of Patent: May 10, 2016

(54) WHEELCHAIR SECUREMENT SYSTEM AND DEVICE FOR WHEELCHAIR ACCESSIBLE VEHICLES

(71) Applicant: Valeda Company, Fort Lauderdale, FL (US)

(72) Inventors: Edgardo Cardona, Fort Lauderdale, FL (US); Aaron E. Kiser, Royal Center, IN (US)

(73) Assignee: Valeda Company, Ft. Lauderdale, FL (US)

( * ) Notice: Subject to any disclaimer, the term of this patent is extended or adjusted under 35 U.S.C. 154(b) by 0 days.

(21) Appl. No.: 14/212,243

(22) Filed: Mar. 14, 2014

(65) Prior Publication Data

US 2014/0356090 A1 Dec. 4, 2014

Related U.S. Application Data (60) Provisional application No. 61/799,911, filed on Mar. 15, 2013.

(51) Int. Cl.
*B60P 7/08* (2006.01)
*A61G 3/08* (2006.01)
*A61G 3/06* (2006.01)

(52) U.S. Cl.
CPC ............. *A61G 3/0808* (2013.01); *B60P 7/0807* (2013.01); *B60P 7/0823* (2013.01); *A61G 3/061* (2013.01)

(58) Field of Classification Search
CPC ..... B60P 7/0807; B60P 7/0823; A61G 3/061; A61G 3/0808

USPC ............... 410/7, 8, 9, 10, 11, 12, 23, 100; 297/DIG. 4; 248/499; 296/65.04

See application file for complete search history.

(56) References Cited

U.S. PATENT DOCUMENTS

| 5,026,225 A | 6/1991 | McIntyre |
| 5,618,151 A | 4/1997 | Rosenkranz |

(Continued)

FOREIGN PATENT DOCUMENTS

| EP | 2564824 A2 | 3/2013 |
| GB | 2364028 A | 1/2002 |

(Continued)

OTHER PUBLICATIONS

MobilityWorks Commercial Flex Flat Ramp System, known and accessible to the public at least prior to May 14, 2013, retrieved from the Internet at: http://www.mobilityworks.com/Commercial/flexflatramp.php (1 page).

(Continued)

*Primary Examiner* — Stephen Gordon
(74) *Attorney, Agent, or Firm* — Daniel A. Tallitsch; Baker & McKenzie LLP (57) ABSTRACT

The embodiments described and claimed herein relate to a wheelchair securement system that includes a wheelchair securement area, wherein the securement area comprises a front end and a rear end. The securement system includes a first restraint, a second restraint, a third restraint, and a fourth restraint, each of which is anchored near the front end of the securement area and is adapted to extend from the front end of the securement area, wherein the first restraint and the second restraint are adapted to connect to a front portion of the wheelchair, and the third restraint and the fourth restraint are adapted to connect to rear portion of the wheelchair.

18 Claims, 7 Drawing Sheets

(56) References Cited

U.S. PATENT DOCUMENTS

| | | |
|---|---|---|
| 5,632,593 A | 5/1997 | Aoki |
| 5,678,932 A | 10/1997 | Cohn |
| 5,803,615 A | 9/1998 | Cohn |
| 5,823,723 A * | 10/1998 | Finch .................... 410/22 |
| 5,865,593 A | 2/1999 | Cohn |
| 5,888,038 A | 3/1999 | Ditch et al. |
| 6,010,298 A | 1/2000 | Cohn et al. |
| 6,039,528 A | 3/2000 | Cohn |
| RE36,805 E | 8/2000 | Kempf |
| 6,095,747 A | 8/2000 | Cohn |
| 6,186,733 B1 | 2/2001 | Lewis et al. |
| 6,203,265 B1 | 3/2001 | Cohn et al. |
| 6,210,098 B1 | 4/2001 | Cohn et al. |
| 6,238,168 B1 | 5/2001 | Cohn et al. |
| 6,276,732 B1 | 8/2001 | Hauss |
| 6,340,280 B1 | 1/2002 | Mollick et al. |
| 6,406,230 B1 | 6/2002 | Mason et al. |
| 6,409,458 B1 | 6/2002 | Cohn et al. |
| 6,524,039 B1 | 2/2003 | Magnuson et al. |
| 6,602,041 B2 | 8/2003 | Lewis et al. |
| 6,843,635 B2 | 1/2005 | Cohn |
| 6,872,037 B2 | 3/2005 | Girardin |
| 6,899,497 B2 | 5/2005 | Cardona et al. |
| 6,971,834 B2 | 12/2005 | Morris |
| 7,040,847 B1 | 5/2006 | Cardona |
| 7,326,024 B2 | 2/2008 | Cohn et al. |
| 7,384,232 B2 | 6/2008 | Morris |
| 7,455,490 B1 | 11/2008 | Goosen |
| 7,500,818 B1 | 3/2009 | Johnson |
| 7,533,432 B2 | 5/2009 | Morris et al. |
| 7,533,433 B2 | 5/2009 | Morris et al. |
| 7,533,434 B2 | 5/2009 | Morris et al. |
| 7,681,272 B2 | 3/2010 | Morris et al. |
| 7,717,655 B2 | 5/2010 | Cardona |
| 7,766,127 B2 | 8/2010 | Morris et al. |
| 7,870,630 B2 | 1/2011 | Johnson |
| 7,870,631 B2 | 1/2011 | Morris et al. |
| 7,896,134 B2 | 3/2011 | Morris et al. |
| 7,913,341 B1 | 3/2011 | Morris et al. |
| 7,913,342 B1 | 3/2011 | Morris et al. |
| 7,913,343 B1 | 3/2011 | Cohn |
| 8,020,234 B2 | 9/2011 | Johnson et al. |
| 8,032,963 B2 | 10/2011 | Morris et al. |
| 8,122,552 B2 | 2/2012 | Morris et al. |
| 8,122,553 B1 | 2/2012 | Johnson et al. |
| 8,132,281 B1 | 3/2012 | Johnson et al. |
| 8,166,594 B1 | 5/2012 | Morris |
| 8,181,300 B1 | 5/2012 | Johnson et al. |
| 8,215,020 B1 | 7/2012 | Johnson |
| 8,230,539 B2 | 7/2012 | Morris et al. |
| 8,234,737 B2 | 8/2012 | Morris et al. |
| 8,240,053 B1 | 8/2012 | Johnson |
| 8,250,693 B1 | 8/2012 | Johnson et al. |
| 8,286,754 B2 | 10/2012 | Cohn |
| 8,302,235 B1 | 11/2012 | Bailie et al. |
| 8,313,088 B2 | 11/2012 | Thompson |
| 8,327,485 B1 | 12/2012 | Morris et al. |
| 8,332,981 B2 | 12/2012 | Woo et al. |
| 8,359,691 B2 | 1/2013 | Morris et al. |
| 8,375,496 B1 | 2/2013 | Johnson et al. |
| 8,382,539 B2 | 2/2013 | Richeux et al. |
| 8,397,329 B2 | 3/2013 | Just et al. |
| 8,398,356 B2 | 3/2013 | Sandoz |
| 8,402,660 B1 | 3/2013 | Johnson et al. |
| 8,413,280 B2 | 4/2013 | Goin et al. |
| 8,424,254 B2 | 4/2013 | Ballester |
| 8,434,181 B1 | 5/2013 | Johnson et al. |
| 8,438,683 B1 | 5/2013 | Morris et al. |
| 8,448,383 B2 | 5/2013 | Bode |
| 8,479,337 B1 | 7/2013 | Morris |
| 8,505,141 B2 | 8/2013 | Morris et al. |
| 8,511,734 B2 | 8/2013 | Hutchins, Jr. et al. |
| 8,517,659 B2 | 8/2013 | Koretsky et al. |
| 8,523,508 B2 | 9/2013 | Hurler |
| 8,533,884 B1 | 9/2013 | Johnson et al. |
| 8,534,979 B2 | 9/2013 | Hansen |
| 8,540,214 B2 | 9/2013 | Christian |
| 8,555,443 B2 | 10/2013 | Couto et al. |
| 8,561,238 B1 | 10/2013 | Inget |
| 8,562,279 B2 | 10/2013 | Beck et al. |
| 8,578,536 B1 | 11/2013 | Morris |
| 8,590,159 B1 | 11/2013 | Johnson et al. |
| 8,621,696 B1 | 1/2014 | Morris |
| 8,628,099 B2 | 1/2014 | Gregory et al. |
| 8,631,528 B1 | 1/2014 | Johnson |
| 8,635,729 B1 | 1/2014 | Johnson et al. |
| D706,513 S | 6/2014 | LaBarbera et al. |
| 8,739,341 B1 | 6/2014 | Morris |
| 8,739,935 B2 | 6/2014 | Zuercher et al. |
| 8,745,800 B1 | 6/2014 | Morris |
| 8,763,186 B2 | 7/2014 | Mosey et al. |
| 8,764,088 B1 | 7/2014 | Jobe |
| 8,764,372 B2 | 7/2014 | Fletcher et al. |
| 8,769,823 B1 | 7/2014 | Johnson et al. |
| 8,770,645 B2 | 7/2014 | Bruns |
| 8,782,840 B2 | 7/2014 | Saucier |
| 8,783,701 B1 | 7/2014 | Blevins |
| 8,789,888 B2 | 7/2014 | Tscherbner et al. |
| 8,800,087 B2 | 8/2014 | Couto et al. |
| 8,800,582 B2 | 8/2014 | Hooper et al. |
| 8,813,289 B1 | 8/2014 | Clark et al. |
| 8,813,290 B1 | 8/2014 | Morris |
| 8,816,225 B2 | 8/2014 | Deleo et al. |
| 8,832,890 B2 | 9/2014 | Loftis et al. |
| 8,832,892 B2 | 9/2014 | Goin et al. |
| 8,832,893 B1 | 9/2014 | Morris et al. |
| 8,869,333 B2 | 10/2014 | Johnson et al. |
| 8,887,337 B1 | 11/2014 | Morris et al. |
| 8,926,254 B2 | 1/2015 | Pocobello et al. |
| 8,938,837 B1 | 1/2015 | Johnson et al. |
| 2001/0005478 A1 | 6/2001 | Lewis et al. |
| 2001/0008606 A1 | 7/2001 | Lewis et al. |
| 2001/0043853 A1 | 11/2001 | Lewis et al. |
| 2001/0048870 A1 | 12/2001 | Lewis et al. |
| 2001/0049908 A1 | 12/2001 | Cohn et al. |
| 2002/0057960 A1 | 5/2002 | Cohn et al. |
| 2002/0197141 A1 | 12/2002 | Cohn |
| 2003/0007853 A1 | 1/2003 | Cohn et al. |
| 2003/0213653 A1 | 11/2003 | Morris |
| 2004/0057823 A1 | 3/2004 | Morris |
| 2004/0094365 A1 | 5/2004 | Morris |
| 2004/0136820 A1 | 7/2004 | Cohn |
| 2007/0207020 A1 | 9/2007 | Samuels et al. |
| 2008/0017455 A1 | 1/2008 | Cohn et al. |
| 2008/0101905 A1 | 5/2008 | Morris et al. |
| 2008/0121467 A1 | 5/2008 | Morris et al. |
| 2008/0187425 A1 | 8/2008 | Morris et al. |
| 2008/0271266 A1 | 11/2008 | Johnson |
| 2008/0271267 A1 | 11/2008 | Morris et al. |
| 2008/0271268 A1 | 11/2008 | Johnson |
| 2008/0271269 A1 | 11/2008 | Morris et al. |
| 2008/0273956 A1 | 11/2008 | Morris et al. |
| 2008/0283340 A1 | 11/2008 | Cohn |
| 2009/0035111 A1 | 2/2009 | Morris et al. |
| 2009/0035112 A1 | 2/2009 | Morris et al. |
| 2009/0035113 A1 | 2/2009 | Morris et al. |
| 2009/0087278 A1 | 4/2009 | Girardin et al. |
| 2009/0271934 A1 | 11/2009 | Morris et al. |
| 2011/0023246 A1 | 2/2011 | Morris et al. |
| 2011/0027054 A1 | 2/2011 | Hansen |
| 2011/0072598 A1 | 3/2011 | Morris et al. |
| 2011/0088174 A1 | 4/2011 | Morris et al. |
| 2011/0088175 A1 | 4/2011 | Morris et al. |
| 2011/0088176 A1 | 4/2011 | Cohn |
| 2011/0088177 A1 | 4/2011 | Johnson et al. |
| 2011/0088179 A1 | 4/2011 | Morris et al. |
| 2012/0233787 A1 | 9/2012 | Couto et al. |
| 2012/0259544 A1 | 10/2012 | Watson, II et al. |
| 2012/0279417 A1 | 11/2012 | Charbonneau et al. |
| 2012/0297558 A1 | 11/2012 | Wang et al. |
| 2013/0045069 A1 | 2/2013 | Day |
| 2013/0055511 A1 | 3/2013 | McGivern et al. |
| 2013/0074686 A1 | 3/2013 | Serpeault |
| 2013/0134733 A1 | 5/2013 | Peters |

(56) References Cited

U.S. PATENT DOCUMENTS

| | | |
|---|---|---|
| 2013/0136567 A1 | 5/2013 | Hambardzumyan |
| 2013/0168165 A1 | 7/2013 | Bartel et al. |
| 2013/0174359 A1 | 7/2013 | Morris et al. |
| 2013/0219637 A1 | 8/2013 | Goin et al. |
| 2013/0229027 A1 | 9/2013 | Copp et al. |
| 2013/0276247 A1 | 10/2013 | Saucier et al. |
| 2013/0294873 A1 | 11/2013 | Chastain, Jr. |
| 2013/0330157 A1 | 12/2013 | Asztalos et al. |
| 2014/0123411 A1 | 5/2014 | Mosey et al. |
| 2014/0124337 A1 | 5/2014 | Murphy |
| 2014/0199144 A9 | 7/2014 | Asztalos et al. |
| 2014/0216838 A1 | 8/2014 | Avigad et al. |
| 2014/0219753 A1 | 8/2014 | Alasfour |
| 2014/0219756 A1 | 8/2014 | Smith et al. |
| 2014/0231175 A1 | 8/2014 | Mueller |
| 2014/0245548 A1 | 9/2014 | Johnson et al. |
| 2014/0248109 A1 | 9/2014 | Johnson et al. |
| 2014/0255138 A1 | 9/2014 | Bruns |
| 2014/0353948 A1 | 12/2014 | Hermanson |
| 2014/0356090 A1 | 12/2014 | Cardona |
| 2014/0356116 A1 | 12/2014 | Hermanson et al. |
| 2014/0369778 A1 | 12/2014 | Hermanson et al. |
| 2015/0013082 A1 | 1/2015 | Fisher et al. |

FOREIGN PATENT DOCUMENTS

| | | |
|---|---|---|
| JP | 2004097364 A | 4/2004 |
| JP | 2011062351 A | 3/2011 |
| JP | 2012205746 A | 10/2012 |
| WO | 2009029773 A2 | 3/2009 |
| WO | 2011044699 A1 | 4/2011 |

OTHER PUBLICATIONS

International Search Report and Written Opinion dated Nov. 6, 2014 in International Patent Application No. PCT/US2014/040350 (Publ. No. WO2014/194265) (3 pages).

International Search Report and Written Opinion dated Nov. 27, 2014 in International Patent Application No. PCT/US2014/0000096 (Publ. No. WO2014/185962) (3 pages).

Qube Sales Brochure No. MKM4804 from Q'Straint's Website (2 pages); uploaded Oct. 9, 2015.

Lok-It Sales Brochure from American Seating's Website (2 pages); uploaded Oct. 9, 2015.

2. Non-Final Rejection from USPTO dated Mar. 18, 2015 for U.S. Appl. No. 14/120,317.

The Extended European Search Report issued on Feb. 16, 2016 by the EPO in co-pending EP Appl. No. 14250042.0 (Publ. No. 2,777,667).

* cited by examiner

WHEELCHAIR SECUREMENT SYSTEM AND DEVICE FOR WHEELCHAIR ACCESSIBLE VEHICLES

CROSS-REFERENCE TO RELATED APPLICATIONS

This patent application claims priority to U.S. Provisional Patent Application No. 61/799,911 filed on Mar. 15, 2013, which is incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC

Not Applicable.

BACKGROUND

1. Technical Field

The embodiments described and claimed herein relate generally to wheelchair securement methods, systems, and devices for wheelchair accessible vehicles.

2. Background Art

Proper use of a wheelchair securement system (also referred to as a wheelchair tie-down system) is important for the safe transportation of people traveling on wheelchairs. In small spaces, such as the space in a rear-entry vehicle, it is important that the wheelchair securement system is simple and safe to use. Occupants in wheelchairs who are not able to transfer or move into a vehicle chair usually depend on the wheelchair securement assemblies (also referred to as wheelchair tie-downs or wheelchair tie-down assemblies) to safely secure their wheelchair while traveling. Proper securement of a wheelchair is critical so that an occupant restraint system can also be safely applied to the occupant. This represents a challenge especially in a public transportation environment as there are many different types of wheelchairs and therefore the tie-down assemblies need to be universally applicable in order to safely secure the majority of them. On a private vehicle however, the wheelchair tie-down can be tailored to a specific wheelchair and occupant which may assist in reducing the challenges of proper securement of the wheelchair and the occupant.

Existing securement systems used in smaller, more compact vehicles or tight or confined wheelchair spaces suffer from many drawbacks, some of which are described below. Such spaces, like existing rear-entry vehicles (also referred to as rear-entry wheelchair accessible vehicles), do not offer enough space for the front of a wheelchair to be secured after it is in place in the securement area of the vehicle. As such, it is important for a fully integrated system in a rear-entry vehicle to be useable from behind the wheelchair passenger. Similarly, in other confined wheelchair securement areas, it is difficult to reach a portion of the wheelchair needed securement once it is in place. In these vehicles, it may be important for a fully integrated system to be usable from in front of the wheelchair passenger.

In addition, there is a trend towards using smaller vehicles with confined wheelchair securement areas, such as smaller rear-entry vehicles in many global markets for varying reasons such as size, weight, and/or fuel efficiency. Smaller rear-entry vehicles generally tend to have a small installation or securement footprint for wheelchairs. Current 4-Point Retractor Systems can be very difficult to use since the space requirement is larger than the space available in a rear entry vehicle. Typically the retractors require some type of track and/or anchor points on the floor; two on the front and two on the rear. The retractors have a limited amount of webbing and require that the wheelchair be in place inside the vehicle before securing the front tie downs which is very challenging since the wheelchair occupies nearly all space available. The rear retractors need to be removable so the wheelchair can be pushed into position. This means that the refractor assemblies have to be stored someplace else inside the vehicle, which means additional steps and time to secure the wheelchair. Additionally the rear retractors are not permanently attached and can be lost or forgotten outside the vehicle. As such, any design for a wheelchair securement system in rear-entry vehicle that takes less space in the vehicle, can potentially have a large impact on the size of wheelchairs that can be secured.

Third, the securement assemblies, and specifically the restraints, may not secure the wheelchair at optimal angles. Smaller installation spaces and larger wheelchairs make this increasingly difficult since the optimal restraint angle is a function of the space size, size of wheelchair and restraints and location of restraints. It is critical to reduce the footprint of the securement mechanism or system, therefore creating more space for optimal angles, especially in the rear of the wheelchair after the wheelchair is secured in the vehicle.

Accordingly, there is a need for an improved securement system for securing wheelchairs in vehicles.

BRIEF SUMMARY

In a one embodiment, a wheelchair securement system for securing a wheelchair in a vehicle is provided. The wheelchair securement assembly includes a wheelchair securement area, a first restraint, a second restraint, a third restraint and a fourth restraint. The wheelchair securement area comprises a front end and a rear end. All of the restraints are anchored at the same end of the wheelchair securement area. In one case, all restraints are anchored at the front end of the securement area. In that case, the first and second restraints extend from the front end and attach to frame members in a front area of the wheelchair. The third and forth restraints extend from the front end to guides at the rear end of the securement area, and then extend from the guides and attach to frame members in a rear area of the wheelchair. In another case, all restraints are anchored at the rear end of the securement area. In that case, the first and second restraints extend from the rear end and attach to frame members in a rear area of the wheelchair. The third and forth restraints extend from the rear end to guides at the front end of the securement area, and then extend from the guides and attach to frame members in a front area of the wheelchair.

Other embodiments, which include some combination of the features discussed above and below and other features which are known in the art, are contemplated as falling within the claims even if such embodiments are not specifically identified and discussed herein.

BRIEF DESCRIPTION OF THE SEVERAL VIEW OF THE DRAWINGS

These and other features, aspects, objects, and advantages of the embodiments described and claimed herein will become better understood upon consideration of the following detailed description, appended claims, and accompanying drawings where:

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION

Figure 1:
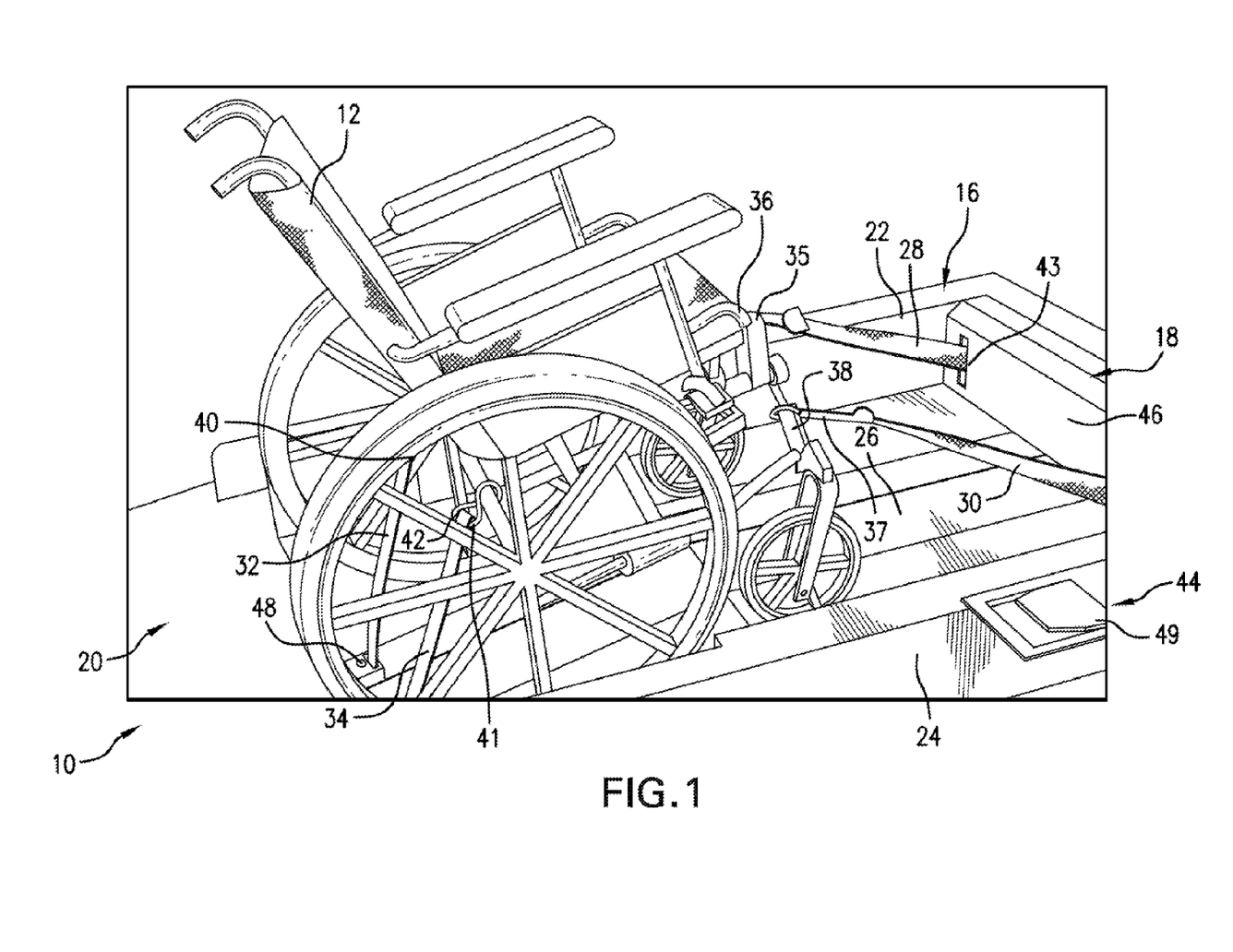
FIG. 1 is a perspective view illustrating a first embodiment of a securement system used to secure a wheelchair in a vehicle.

Referring first to FIG. 1, one embodiment of a wheelchair securement system 10 is shown for securing a wheelchair 12 in a vehicle 14. As shown in FIG. 1, the wheelchair securement system 10 includes a wheelchair securement area (or wheelchair pan) 16 having a front end 18 (or a front area 18) and a rear end 20 (or a rear area 20 and a securement housing 46). The securement system 10 further includes a first restraint 28, a second restraint 30, a third restraint 32, and a fourth restraint 34, a first wheelchair attachment point 36, a second wheelchair attachment point 38, a third wheelchair attachment point 40, and a fourth wheelchair attachment point 42, a first restraint guide 48, a second restraint guide 50, and a release system 44. The first and second restraints 28 and 30 comprise a first or front restraint assembly for connecting to and securing the front portion of the wheelchair. Similarly, the third and fourth restraints, 32 and 34 comprise a second or rear restraint assembly for connecting to and securing rear portions of the wheelchair.

Depending upon the design of the wheelchair, the connectors (shown as hooks in FIG. 1) of the front restraint assembly may connect to a single location or point of attachment on the wheelchair, or if two front restraints are used, may connect to left and right sides of the front of the wheelchair, but in either case, the connectors should engage a structural component of the wheelchair, as opposed (for example) the front wheels or their supports. Similarly, again depending upon the design of the wheelchair, the connectors (shown as hooks in FIG. 1) of the rear restraint assembly may connect to a single location or point of attachment on the wheelchair, or, if two restraints are used, may connect to left and right sides of the rear of the wheelchair, but in either case, the connectors should engage a structural component of the wheelchair, as opposed (for example) the rear wheels or their spokes.

In at least one embodiment, the first, second, third, and fourth restraints include, respectively, a first wheelchair connector 35, a second wheelchair connector 37, a third wheelchair connector 39, a fourth wheelchair connector 41. The release system 44 includes a toggle 49 and a controller 47.

The restraints shown in FIG. 1 (i.e., the first restraint 28, the second restraint 30, the third restraint 32, and the fourth restraint 34) generally work in conjunction with each other to secure the wheelchair 12 in the vehicle 14. Generally speaking, the securement system 10 includes at least a secured configuration and an unsecured configuration. In the secured configuration of securement system 10, each restraint in the system is connected to a corresponding wheelchair attachment point in such a way that the system 10 secures, in part, the wheelchair 12 to the vehicle 14. In the secured configuration, the wheelchair 10 is generally not movable, which assists in ensuring safe transportation of an occupant of the wheelchair 12.

In the unsecured configuration of securement system 10, the wheelchair 12 is not secured to the inside of the vehicle 14. It should be understood that in the unsecured configuration, the wheelchair 12 may be connected to any one or all of the restraints but those restraints may not be fully securing the wheelchair 12, but rather could be aiding to bring the wheelchair into or take the wheelchair out of the securement area. Alternatively, in the unsecured configuration, the wheelchair 12 may be connected to none of the restraints in FIG. 1. FIG. 1 illustrates an embodiment of the system 10 in its secured configuration such that the wheelchair 12 is fully secured in the securement area 16 of vehicle 14.

In the embodiment shown, all four restraints in FIG. 1 (i.e., the first restraint 28, the second restraint 30, the third restraint 32, and the fourth restraint 34) are adapted to be anchored near the front end 18 of the securement area 16, in the securement housing 46, and each restraint is adapted to extend from the front end 18 to connect to a corresponding wheelchair attachment point. Generally speaking, the first restraint 28 and the second restraint 30 are adapted to connect to a front portion of the wheelchair 12, and as such are also referred to as the front restraints 28 and 30. In connecting to the wheelchair 12, the restraints 28 and 30 are shown passing through restraint guides 76 and 78 located at the front end of the securement area 16. The third restraint 32 and the fourth restraint 34 are generally adapted to connect to one or more rear portions of the wheelchair 12, and as such are also referred to as the rear restraints 32 and 34, even though all four restraints are adapted to be anchored to the vehicle near the front end 18 of the area 16.

As shown in FIG. 1, the first restraint 28 passes through a first opening, or belt guide 43 in the securement housing 46 near the front end 18, wherein the first wheelchair connector 35 is positioned to connect to the first attachment point 36 on the wheelchair 12. The second restraint 30 passes through the second opening, or belt guide 45 in the securement housing 46, wherein the second wheelchair connector 37, is positioned to connect to the second attachment point 38 on the wheelchair 12. In the embodiment shown, the first and second wheelchair attachment points 36 and 38 are structural or frame members generally disposed on the front area of the wheelchair 12. The third restraint 32 is adapted to extend from the front end 18 to the rear end 20, where it passes through the first restraint guide 48 and then extend from the first restraint guide 48 to a rear portion of the wheelchair 12, wherein the third wheelchair connector 39 is positioned to connect to the third attachment point 40 on the wheelchair 12. The fourth restraint 34 is adapted to extend from the front end 18 to the rear end 20, where it passes through the second restraint guide 50 and then extend from the second restraint guide 50 to a rear portion of the wheelchair 12, wherein the fourth wheelchair connector 41 is positioned to connect to the fourth attachment point 42 on the wheelchair 12. In the embodiment shown, the third and fourth wheelchair attachment points 40 and 42 are structural or frame members generally disposed on the rear area of the wheelchair 12.

For purposes of this description, it is assumed that securement area (or wheelchair pan) 16 and its front end 18 are oriented in a way that corresponds to the orientation of the vehicle 14 of which it is a part. Thus, the rear end 20 of the securement area also corresponds with a rear end of the vehicle 14. As such, the orientation of the securement area 16 and/or securement system 10 is described with respect to the orientation of the vehicle 14, and the longitudinal axis of the securement area is generally parallel to the longitudinal axis of the vehicle. In this regard, the front end 18 of securement area 16 is closer to the front end of the vehicle 14 than the rear end of the securement area 16, and the rear end 20 of the securement area 16 is closer to the rear end of the vehicle 14. It is contemplated, however, that the securement area may be installed in different types of vehicles in different orientations, whether it be forward facing, rear facing, or side facing. The entry orientation to the wheelchair securement area may vary from allowing entry from the front, side, or rear. For example, in a para-transit vehicle, the wheelchair will enter the securement area facing forward, but will travel backwards into the securement area. In this case, it may be beneficial for the housing (and all internal components, including the retractors, etc.) to be located at the rear of the securement area. As such, the restraints extending directly from the housing would be connected to the rear of the wheelchair first, then the wheelchair would be rolled back into the securement area, followed by securing the front of the wheelchair with restraints that extend from the housing (at the rear of the securement area) to guides at the front of the securement area and then to the wheelchair.

Figure 2:
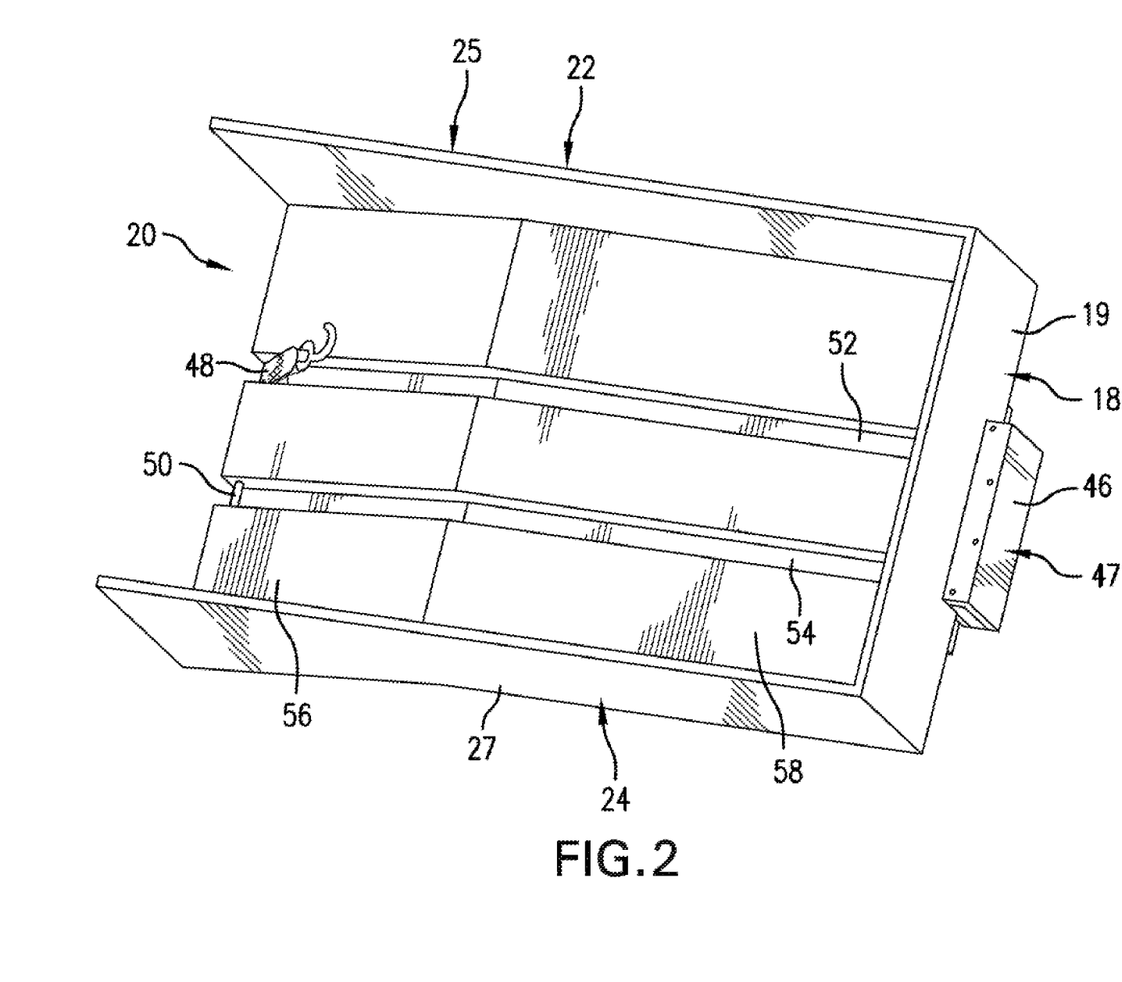
FIG. 2 is a perspective view illustrating a first embodiment of a securement area adapted to secure the wheelchair in the vehicle.
Figure 3:
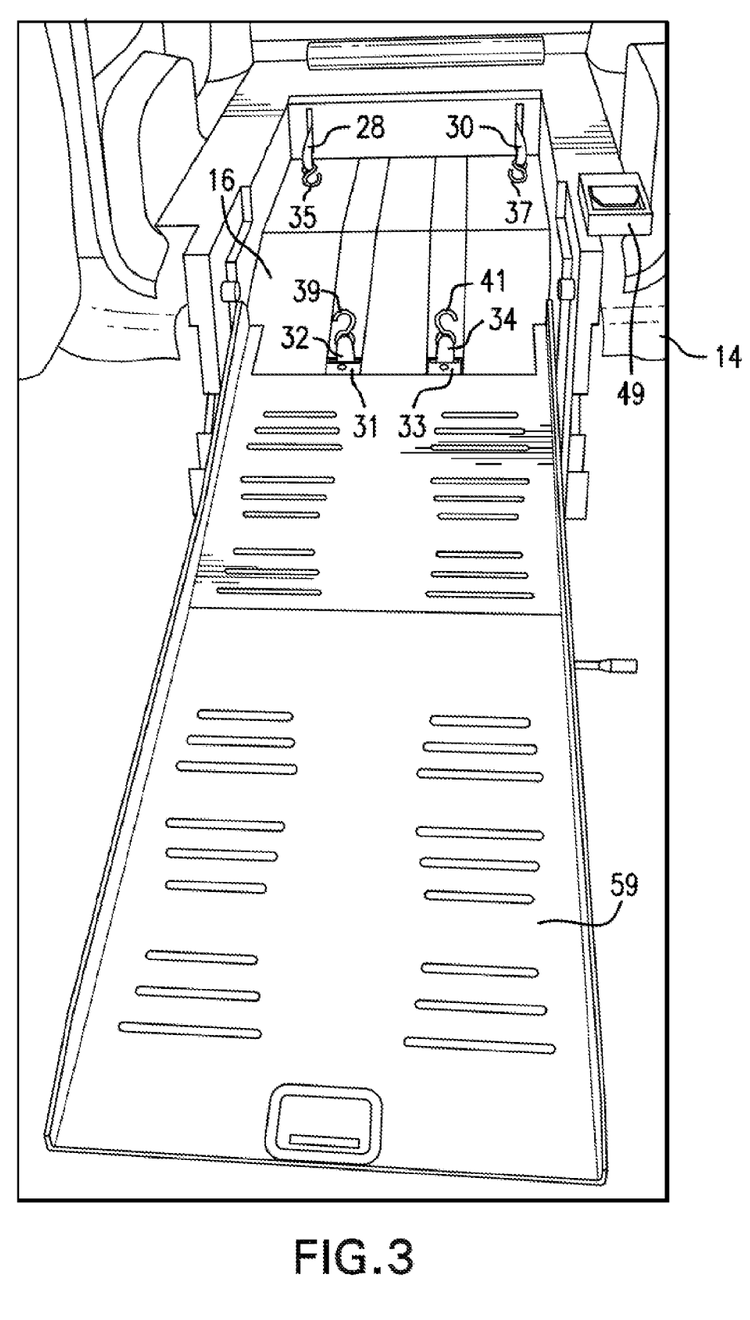
FIG. 3 is a perspective view of the securement system of FIG. 1 mounted to a vehicle.
Figure 4:
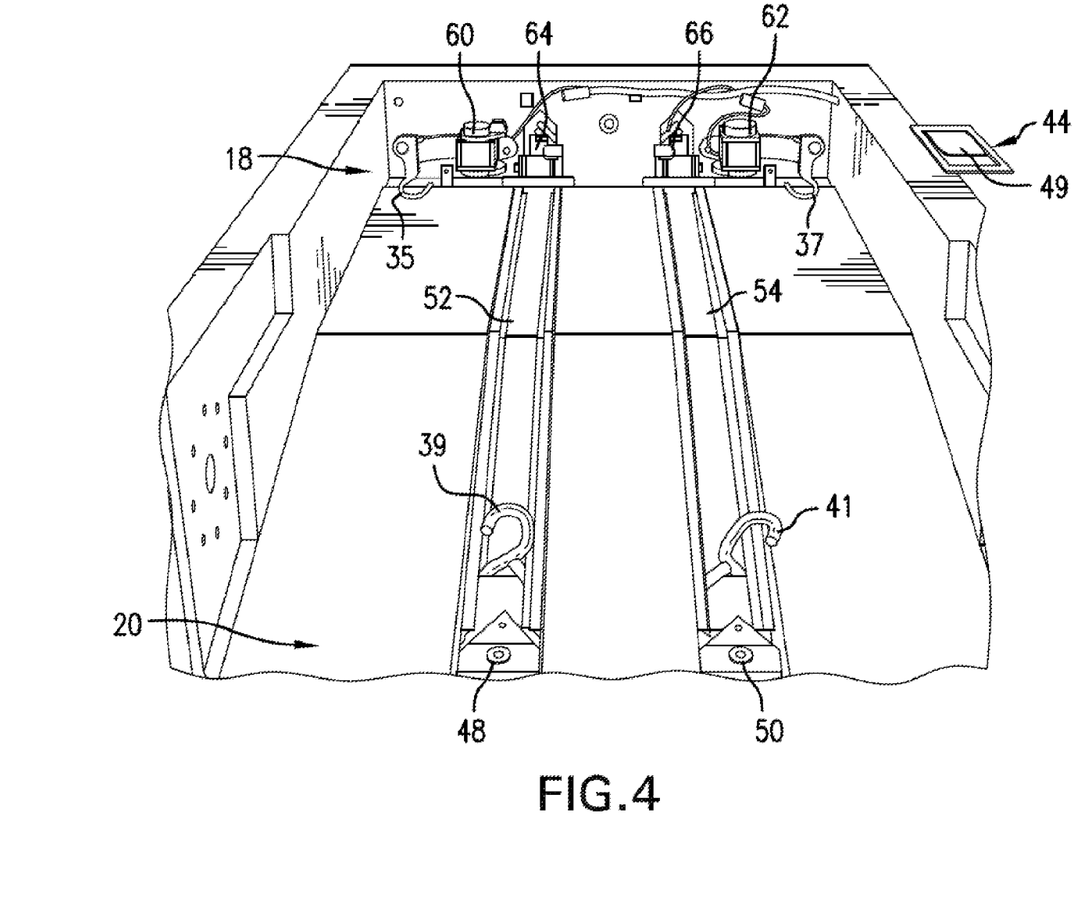
FIGS. 4-5 are perspective views illustrating a first embodiment of the components used in connection with the securement system of FIG. 1.

The wheelchair securement area 16 is described more fully in connection with FIGS. 2-4, but it should be noted, as a general matter, that securement area 16 is generally an area in the securement system 10 that is adapted for securing the wheelchair 12 in the vehicle 14. In one embodiment, the securement area 16 is an area in which all restraints are anchored at or near one end of the area, wherein the retractors and their corresponding restraints are at least partially housed in the securement housing 46, and are adapted to be extendable from that end to the secure the wheelchair 12 in the vehicle 14. In the embodiment shown in FIG. 1, all of the restraints are anchored in the securement housing 46 which is positioned at the front end 18 of the area 16.

As shown in FIG. 1, the securement area 16 includes the front end 18, the rear end 20, a first side 22, a second side 24, and the floor 26, all of which work in combination with each other to provide an area in which a wheelchair 12 can be secured. As discussed in connection with FIGS. 2-4 below, in one embodiment, the wheelchair securement area 16 is integrally connected to the inside of vehicle 14. In this embodiment or in another embodiment, the securement area 16 is mounted flush in a rear portion of the vehicle 14, thereby allowing wheelchair 12 to enter the vehicle from the rear, and exit the vehicle 14 from the rear, using a ramp.

Generally, a wheelchair attachment point is any point or portion on the wheelchair 12 is structurally sound for connection with a restraint. There may be several options on any given wheelchair or mobility device, both for front and rear connection. As noted above, the system 10 includes the first wheelchair attachment point 36, the second wheelchair attachment point 38, the third wheelchair attachment point 40, and the fourth wheelchair attachment point 42. In the shown embodiment, the wheelchair attachment points are frame members of the wheelchair.

Generally, a wheelchair connector is any type of connector that is adapted to connect the restraint to a wheelchair attachment point. As shown in FIG. 1, the system 10 includes the first wheelchair connector 35, the second wheelchair connector 37, the third wheelchair connector 39, and the fourth wheelchair connector 41. The first wheelchair connector 35, as a general matter, is any type of connector adapted to connect a portion of the first restraint 28 to the first wheelchair attachment point 36. In one embodiment, the wheelchair connectors are universal fasteners or anchors that are adapted to connect to most wheelchairs. The wheelchair connectors can be, for example, S-hook or J-hook fasteners. In yet another embodiment the wheelchair connectors are simply a portion of the restraint that loops around a frame member of the wheelchair.

A restraint guide is generally adapted to guide a portion of a restraint in one or more direction(s). As shown in FIG. 1, the system 10 includes a first restraint guide 48 and a second restraint guide 50. In the embodiment shown, the first restraint guide 48 and the second restraint guide 50 are generally disposed near the rear end 20 of the securement area 16. In one embodiment, the first restraint guide 48 is a pivoting plate that allows the third restraint to change the direction in which it extends, left and right, such that the third restraint 32 is adapted to extend towards various possible points of attachment at a rear portion of the wheelchair 14. In another embodiment, the first restraint guide 48 may be a D-ring anchor having a hole or opening through which a portion of the third restraint extends. In yet another embodiment, the first restraint guide 48 may be an opening in the floor of the securement area 16 through which a portion of the third restraint 32 extends. In still yet another embodiment, the first restraint guide 48 includes a channel (e.g., a recessed channel) that limits the path of movement of the third restraint 32 to the channel, rather than being free to move laterally on the floor of the securement area. The channel is preferably recessed as shown in FIG. 2, and with a cover (not shown in FIG. 2, but shown in FIG. 3) protecting the rear restraints 32 and 34. Alternatively, the channel may be mounted on top of the vehicle floor, in which case the protrusion may also act as a guide for the wheels of the wheelchair as it is move into the securement area.

It should be understood that while the discussion above refers to the first restraint guide 48 and channel, the discussion above is also applicable to the second restraint guide 50, which is shown as a round bar that may or may not have a loose-fitting bearing sleeve to facilitate movement of the restraint into and out of the guide channel. Further, it should be understood that the system 10 may include additional restraint guides not shown in FIG. 1. For instance, as discussed in connection with FIG. 2 below, in one embodiment, the securement system 10 includes a third restraint guide or channel 52 and a fourth restraint guide or channel 54, each of which extends from near the front end 18 to near the rear end 20.

A restraint is generally any type of restraint that is adapted to connect to a wheelchair attachment point. In one embodiment, the first restraint 28 is a webbing or a strap that is housed within a retractor, wherein the restraint is adapted to extend away from the retractor to connect to a wheelchair attachment point. In other embodiments, the first restraint 28 comprises a rope, cable, or cord. It should be understood that while the discussion herein refers to the first restraint 28, this discussion is also applicable to the second restraint 30, the third restraint 32, and the fourth restraint 34.

Generally speaking, the first restraint 28, the second restraint 30, the third restraint 32, and the fourth restraint 34, are generally adapted to be anchored near one end of the securement area 16, where the retractors and related hardware can be controlled, as explained more fully below. As shown in FIG. 4, the first restraint 28, the second restraint 30, the third restraint 32, and the fourth restraint 34 are all anchored near the front end 18 of the securement area 16, in the securement housing 46.

It should be understood that the restraints 28, 30, 32, and 34 may each include other components not shown in FIG. 1. For instance, in one embodiment, as explained in connection with FIGS. 4-5, each of the restraints include a corresponding retractor wherein each retractor includes a retractor spool, wherein the restraint is wound on the retractor spool, and wherein a portion of the restraint is adapted to pass from the retractor spool to a wheelchair attachment point.

In one embodiment, each of the restraints shown in FIG. 1 generally operates in at least a locked state and an unlocked state. These states are explained more fully in connection with FIGS. 6A-6D and 7A-7C, but it should be noted as a general matter, that in the locked state for a given restraint, that restraint is generally locked into place so that it cannot extend, although it may be allowed to retract, and in the unlocked state, the restraint is free to extend and retract so that it can be connected or disconnected from its corresponding wheelchair connection point. In some instances (such as in front restraints 28 and 30), the retractors associated therewith have a third state or mode in which the retractor is in an intermediate condition in which pulling on the restraints 28 and 30 will not unwind the restraints (i.e., the restraint is locked against unwinding), but allowing a short winding to occur will then allow free unwinding. Locking mechanisms that are used to lock the restraints so it cannot extend, but can retract, are well known in the art and are contemplated for use in the present embodiments. Such restraints are generally available from the assignee of the present invention; see for example, QStraint's QRT MAX and retractor products and QER-4000.

As a general matter, release system 44 may be mechanical, electrical, or electro-mechanical, and may operate to toggle restraints between their locked states and unlocked states. In one embodiment, the release system 44 comprises a toggle 49 and controller 47 that are mechanically and electrically coupled to one or more locking mechanisms, all of which control or toggle the restraints 28, 30, 32, and 34 between the locked state (or mode) and the unlocked state (or mode), and in the case of the front retractors (for safety during unloading) an intermediate state or mode. For example, the retractors for each restraint can include solenoids that, in response to electrical signals from the toggle 49 and/or controller 47, manipulate the retractor between its locked and unlocked states. In addition, some or all of the retractors may be mechanically manipulated between locked and unlocked states via the toggle 49, while other retractors may be manipulated electronically through communication with the controller 47. In one embodiment, the toggle 49 may interact with a retractor in a manner similar to that U.S. Pat. Nos. 7,452,170 and/or 7,717,655, which are incorporated herein by reference, in their entirety. In another embodiment, the release mechanism 44 comprises a switch that is wirelessly coupled to one or more locking mechanisms that toggle all of the restraints 28, 30, 32, and 34 collectively in unison or in series, between the locked state and the unlocked state.

It should be understood that toggle 49 is generally disposed at a location that allows an operator of the system 16 or an occupant of the wheelchair 12 to control the restraints with relative ease. In one embodiment, the toggle 49 is located outside the securement area 16 near the rear end 20. In another embodiment, the toggle 49 is disposed inside the vehicle towards the front of the vehicle, near where the driver sits when driving the vehicle 14.

It should be understood that the system 10 illustrated in FIG. 1 is exemplary in nature. As such, system 10 may include other components or features not shown. For instance, in one embodiment, the securement system includes an occupant restraint system, such as lap and shoulder belts.

Turning to FIG. 2, a perspective view of the securement area 16 is shown. As shown in FIG. 2, the securement area 16 includes the front end 18, the rear end 20, the first side 22, the second side 24, the floor 26, all of which are adapted to work in combination with each other to provide an area in which a wheelchair 12 can be secured. Further as shown in FIG. 2, the securement area 16 includes a housing 46, a first restraint guide 48, a second restraint guide 50, a third restraint guide 52 and a fourth restraint guide 54.

Generally speaking, the first and second sides 22 and 24 are generally disposed between the front end 18 and the rear end 20. In one embodiment, the first side 22 comprises a first side wall 25 and the second side 24 comprises a second side wall 27. In another embodiment, the first and second sides 22 and 24 do not include sidewalls. Rather, the first side 22 comprises a first interior surface of the vehicle 14 and the second side 24 comprises a second interior surface of the vehicle 14.

The floor 26 in FIG. 2 of the securement area 16 is generally adapted to support the wheelchair 12. In the embodiment shown, the floor 26 comprises an inclined surface 56 and a flat surface 58. In the secured configuration of the system 10, the rear portion of the wheelchair 12 is generally disposed above inclined surface 56, and the front portion of the wheelchair 12 is generally disposed above the flat surface 58.

In one embodiment, the floor 26 includes a first hole 31 and a second hole 33 near the rear end 20. In this embodiment, the first hole 31 allows a portion of the third restraint 32 to extend through it. In this embodiment, the third restraint 32 is adapted to extend from the front end 18 to the rear end 20 below the floor 26 and then extend through the first hole 31, such that a portion of the restraint is adapted to connect a rear portion of the wheelchair 12. In one embodiment, the third restraint 32 is adapted to extend underneath the flat surface 58 and the inclined surface 56. Similarly, in one embodiment the second hole 33 allows portion of the fourth restraint 34 to extend through it. In this embodiment, the fourth restraint 34 is adapted to extend from the front end 18 to the rear end 20 below the floor 26 and then extend through the second hole 33, such that a portion of the restraint is adapted to connect a rear portion of the wheelchair 12. In one embodiment, the fourth restraint 34 is adapted to extend underneath the flat surface 58 and the inclined surface 56.

As shown in FIG. 2, the front end 18 includes a front wall 19 and a housing 46. It should be understood that the front end 18 may include other components or features not shown in FIG. 2. In one embodiment, the front end 18 does not include the front wall 19 but simply includes the housing 46. In another embodiment, the front end 18 does not include the housing 46, but includes a cover that serves to house portion of the restraints that are disposed underneath the cover. In one embodiment, the housing 46 includes components of or connected to the restraints 28, 30, 32, and 34 and/or components that control the operation of the securement system 10 (e.g., a locking mechanism, one of which is described in connection with FIG. 6). In one embodiment, as described in connection with FIGS. 4 and 5, the housing includes retractors and or a control/locking mechanism for controlling the operation of the retractors. As shown in FIG. 2, the rear end 20 includes a ramp 56.

The third restraint guide 52 and the fourth restraint guide 54 are generally any type of restraint guides that are adapted to guide a portion of a restraint in one or more direction(s). As shown in FIG. 2, the third restraint guide 52 is adapted to guide a portion of the third restraint 32 from near the front end 18 to near the rear end 20. In this embodiment, the third restraint guide 52 is disposed between the front end 18 and the rear end 20, and extends from near the front end 18 to near the rear end 20. In one embodiment, the third restraint guide 52 extends from the front end 18 to the rear end 20.

Similarly, the fourth restraint guide 54 is adapted to guide a portion of the fourth restraint 34 from near the front end 18 to near the rear end 20. In this embodiment, the fourth restraint guide 54 is disposed between the front end 18 and the rear end 20, and extends from near the front end 18 to near the rear end 20. In one embodiment, the fourth restraint guide 54 extends from the front end 18 to the rear end 20.

In one embodiment, the third restraint guide 52 comprises a first channel in the floor 26. In this embodiment or in another embodiment, the first channel comprises a recessed channel in the floor 26, and the channel has a cover forming an enclosure around the webbing of the restraint. In another embodiment, the third restraint guide 52 comprises a first hollow sleeve that is retained flush against the floor 26, wherein the first hollow sleeve extends from near the front end 18 to near the rear end 20, wherein the hollow sleeve is adapted to guide a portion of the third restraint 32. In yet another embodiment, the third restraint guide comprises a tube or any type of conduit adapted to guide a portion of the third restraint 32. It should be understood that while this discussion pertains to the third restraint guide 52, it is also applicable to the fourth restraint guide 54. As such, the fourth restraint guide 54 comprises a second channel, a second recessed channel, a second hollow sleeve, a second tube, or a second conduit, any one of which is adapted to guide a portion of the fourth restraint 34 from near the front end 18 (or from the front end 18) to near the rear end 20 (or to the rear end 20).

Further, it should be understood that while the third restraint guide 52 and the fourth restraint guide 54 are described as separate restraint guides, in one embodiment, the third restraint guide 52 and the fourth restraint guide 54 comprise a single restraint guide comprising a single channel, or sleeve, or tube, or conduit, adapted to guide both the third restraint 32 and the fourth restraint 34 in the same restraint guide. It may also be the case that only a single front and/or rear restraint is needed for a particular application. However, in most applications, to maximize stability, a system will require two front restraint assemblies and two rear restraint assemblies.

The first and second restraint guides 48 and 50 were described above in connection with FIG. 1, but it should be understood, that the first and second restraint guides 48 and 50 are any type of restraint guides that are adapted to guide a portion of a restraint in one or more direction(s). As shown in FIG. 2, the first restraint guide 48 comprises a first cylindrically shaped anchor which a portion of the third restraint 32 is adapted to loop around. Like the first restraint guide 48, the second restraint guide 50 comprises a second cylindrically shaped anchor which a portion of the fourth restraint 34 is adapted to loop around. As noted above in connection with FIG. 1, the first and second restraint guides 48 and 50 may each have different embodiments.

In the embodiment shown in FIG. 2, the securement area 16 is in the shape of a rectangle that allows entry of the wheelchair 12 in the area 16 in the forward direction, and allows the wheelchair 12 to exit the area 16 in the reverse direction. As such, in this embodiment, the area 16 is wide enough to allow a wheelchair 12 to be disposed between the first side 22 and the second side 24. In another embodiment, the securement area 16 in the shape of a square. In yet another embodiment, that securement area 16 is in the shape of a tapered square or rectangle such that the rear end 20 is wider than the front end 18. Other shapes of the securement area 16 are also possible. In addition, not all of the wheelchair locations will have boundaries formed by walls or other barriers.

In one embodiment, the securement area 16 is part of or integrally connected to the inside of vehicle 14. In another embodiment, the securement area 16 is anchored to a portion of the vehicle 14 by way of anchors, mounting brackets, and/or screws. In yet another embodiment, the securement area 16 is welded to an inside portion of the vehicle 14. In one embodiment, the securement area 16 is mounted flush in a rear portion of the vehicle 14, thereby allowing wheelchair 12 to enter the vehicle from the rear, and exit the vehicle 14 from the rear using a ramp (e.g., a rear-entry wheelchair accessible vehicle). In one embodiment, securement area 16 is connected to a rear-entry wheelchair accessible vehicle. Securement area 16 may be connected to other types of vehicles. Regardless of the type of vehicle that is used, securement area 16 provides an area adapted to secure the wheelchair 12 to the vehicle 14.

Turning next to FIG. 3, a perspective view of a rear of the vehicle 14 including the securement system 10 is shown. As shown in FIG. 3, the vehicle 14 is a rear entry wheelchair accessible vehicle that includes the securement system 10. As shown in FIG. 3, the securement area 16 is mounted flush in a rear portion of the vehicle 14, thereby allowing wheelchair 12 to enter the vehicle from the rear, and exit the vehicle 14 from the rear using a ramp 59. Further, as shown in FIG. 3, the toggle 49 is disposed near the rear-end of the vehicle 14 that is easily accessible such that an operator of system 16 can control the system 10 with relative ease.

Figure 5:
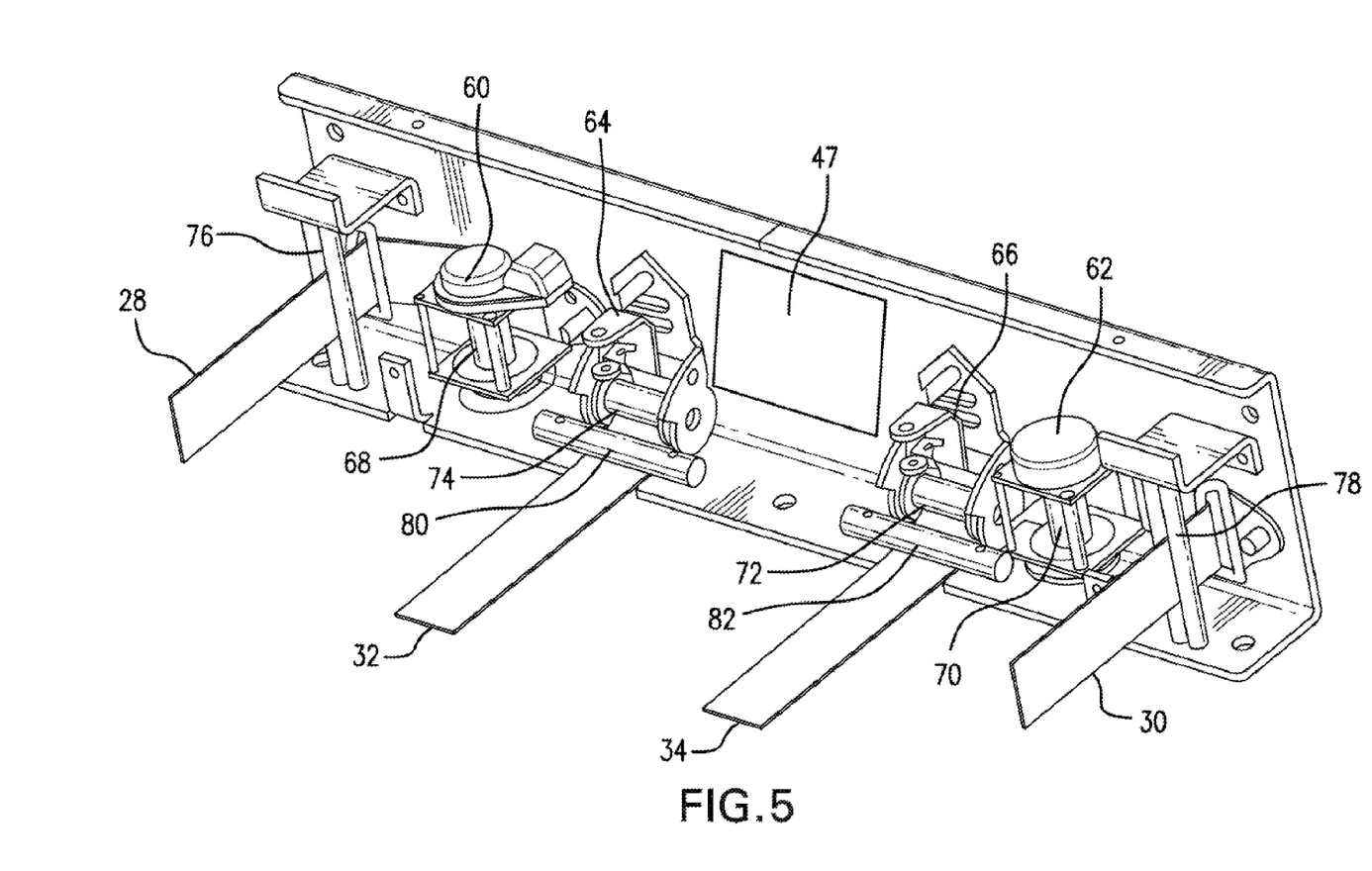

Turning next to FIGS. 4-5, a perspective view of the securement area 16 is provided showing the components that may be disposed near or at the front end 18. As shown in FIGS. 4-5, the front end 18 includes a first retractor 60, a second refractor 62, a third retractor 64, and a fourth retractor 66. The first refractor 60 includes a first retractor spool 68, the second retractor 62 includes a second retractor spool 70, the third retractor 64 includes a third retractor spool 72, and the fourth retractor 66 includes a fourth retractor spool 74.

In the embodiment shown, the first restraint 28 includes webbing that is adapted to be wound on the first retractor spool 68, wherein the webbing is adapted to extend from the first retractor 60 to the first wheelchair attachment point 36 disposed near or at the front of the wheelchair 12. The second restraint 30 includes webbing that is adapted to be wound on the second retractor spool 70, wherein the webbing is adapted to extend from the second retractor 62 to the second wheelchair attachment point 38 disposed near or at the front of the wheelchair 12.

The third restraint 32 includes webbing that is adapted to be wound on the third refractor spool 72, wherein the webbing is adapted to extend from the third retractor 64 to rear end 20, through the first restraint guide 48, and then to the third wheelchair attachment point 40. As shown in FIG. 4, the webbing is adapted to extend from the near front end 18 to near the rear end 20 via the third restraint guide 52. At or near the rear end 20, the third restraint 32 is adapted to engage with the first restraint guide 48 which guides and changes the direction of the third restraint 32 to extend to the rear end 20 and then away from the rear end 20 towards a third wheelchair attachment point 40 disposed near the rear of the wheelchair 12. In the embodiment shown, the first restraint guide 48 comprises an anchor plate having a first hole 31 allowing the third restraint 32 to loop around and extend towards the rear of the wheelchair 12. As shown in FIG. 4, a portion of the third restraint 32 is adapted to connect a wheelchair attachment point 40.

The fourth restraint 34 includes webbing that is adapted to be wound on the fourth retractor spool 74, wherein the webbing is adapted to extend from the fourth retractor 66 to the rear end 20 through the second restraint guide 50, and then to the fourth wheelchair attachment point 42. As shown in FIG. 4, the fourth restraint 34 is adapted to extend from the near front end 18 to near the rear end 20 via the fourth restraint guide 54. At or near the rear end 20, the fourth restraint 34 is adapted to engage with the second restraint guide 50, which guides and changes the direction of the fourth restraint 34 to extend towards the rear end 20, and then towards the rear end of the wheelchair 12. In the embodiment shown, the second restraint guide 50 comprises an anchor plate having a second hole 33 allowing the fourth restraint 34 to loop around and extend towards the rear of the wheelchair 12. As shown in FIG. 4, a portion of the fourth restraint 34 is adapted to connect to a wheelchair attachment point 42.

It should be noted that the first and second retractors 60 and 62 are generally referred to the front-end retractors 60 and 62, respectively, and the third and fourth retractors are generally referred to as the rear-end retractors 64 and 66, respectively, even though all of the retractors are disposed or anchored physically near or at the front end 18.

In one embodiment, as shown in FIG. 5, the front end 18 also includes a first guide 76, a second guide 78, a third guide 80, and a fourth guide 82. The aforementioned guides are generally adapted guide a portion of a restraint as it exits. As shown, the restraint 28 is adapted to extend through the first guide 76, the second restraint 30 is adapted to extend through the second guide 78, the third restraint 32 is adapted to extend through the third guide 80, and the fourth restraint 34 is adapted to extend through the fourth guide 82.

It is contemplated that the system 10 may include sensors (not shown) at or near the guides 76, 78, 80, 22 that sense objects present at various points along the length of the restraints. These sensors, for example, can include proximity sensors that sense magnets attached or sewn into the restraints, or visual sensors that sense markings printed on the restraints. Other embodiments are possible, such as a limiting switch attached to retractor spools, which is activated by webbing around the spool.

The sensors send signals to the controller 47 and allow the control system 44 to properly control the timing and operation of the system 10.

As noted above with respect to the first, second, third, and fourth restraints 28, 30, 32, and 33, each of the retractors shown in FIGS. 4-5 generally operates in at least a locked state and an unlocked state.

In one embodiment, the retractors 60, 62, 64, and 66 are generally anchored near or at the front end 18 in close proximity to one another. In one embodiment, the retractors 60, 62, 64, and 66 are all anchored within the housing (not shown in FIG. 2, but shown in FIG. 5).

Figure 6A:
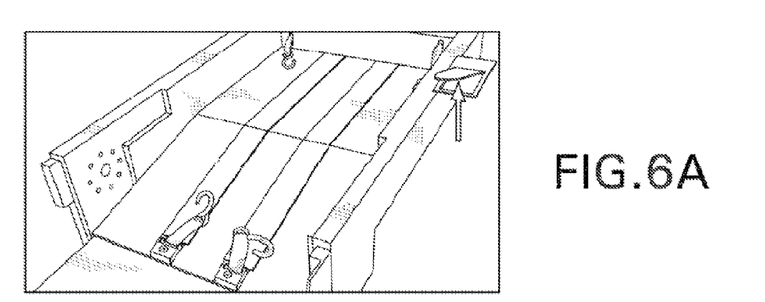
FIGS. 6A-6D are illustrate the steps for securing a wheelchair in a securement area using the securement system of FIG. 1.

FIGS. 6A through 6D illustrate the steps for securing the wheelchair 12 in the area 16. The same reference numerals used to describe the system in connection with FIGS. 1-5. In FIG. 6A, the system 10 is in the unsecured configuration, as result of the lifting of the toggle 49, such that the wheelchair 12 is not yet placed in or secured to the vehicle 14. As such, none of the restraints 28, 30, 32, and 34 are attached to the wheelchair 12, but instead each is in its retracted state. When the toggle 49 is lifted, as shown in FIG. 6a, each of the restraints 28, 30, 32, 34, along with each of the corresponding retractors (i.e., the first retractor 60, the second retractor 62, the third retractor 64, and the fourth retractor 66) are switched from the locked state or mode to the unlocked state or mode.

Figure 6B:
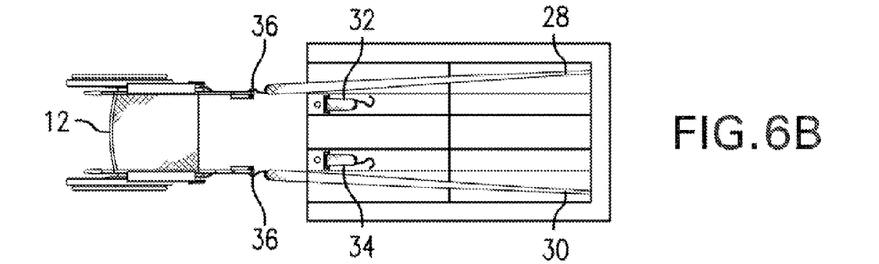

In FIG. 6B, the release system 44 has been activated, and the front restraints 28 and 30 are extended for connection to at least one front (and preferably two opposite sides of the front portion of) a wheelchair 12.

Figure 6C:
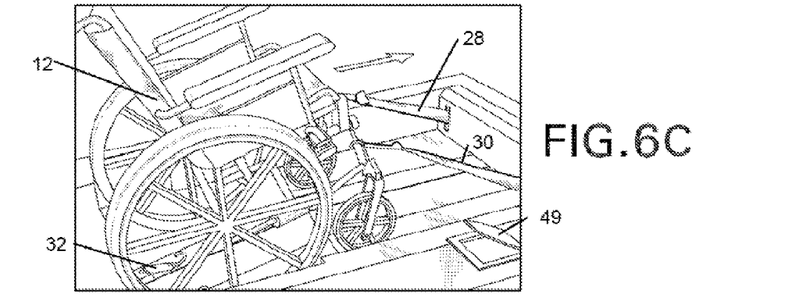

In FIG. 6C, the front two restraints 28 and 30 retract as the wheelchair is move up a ramp towards its final position in the securement area. The controller 47 maintains the front restraints in their unlocked states for a predetermined period of time to allow the steps depicted in FIGS. 6B and 6C to be performed. For example, the controller 47 holds the front retractors 28, 30 in their unlocked state or mode for about 15 to 20 seconds, after the toggle 49 has been lifted. The rear retractors, however, remain unlocked for a longer period of time (e.g., an additional 15 to 20 seconds) so that the front retractors can hold the wheelchair against rolling backward, as the rear restraints 32 and 34 are attached to at least one, or more, attachment location at rear portions of the wheelchair.

Figure 6D:
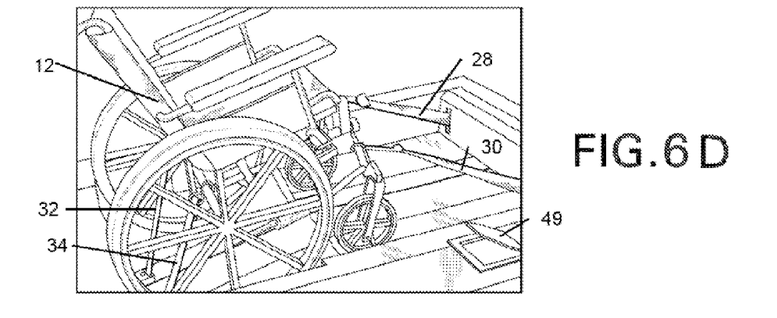

In FIG. 6D, the rear restraints 32 and 34 are attached at least one rear (and preferably two opposite sides of the rear portion of) the wheelchair, while the rear retractors 32 and 34 are in an unlocked state or mode, but while the front retractors 28 and 30 have moved to a locked state. In this preferred arrangement, the controller 47 has placed the locking mechanism for the front restraints 28 and 30 in the locked state, while leaving the rear restraints 32 and 34 unlocked, which allows the wheelchair to be pushed into the securement area 16, but still preventing the wheelchair from rolling backwards inadvertently. In that respect, the wheelchair 12 will not roll out of the vehicle should the vehicle operator slip or fall as the wheelchair is being pushed up the ramp into the vehicle.

In FIG. 6D, after the third restraint 32 and the fourth restraint 34 are attached to the rear of the wheelchair 12, the controller 47 locks the locking members for the rear restraints 32 and 34. In this state, after all the restraints 28, 30, 32, and 34 are connected to their respective wheelchair attachment points, the wheelchair 12 is now in the secured configuration.

Figure 7A:
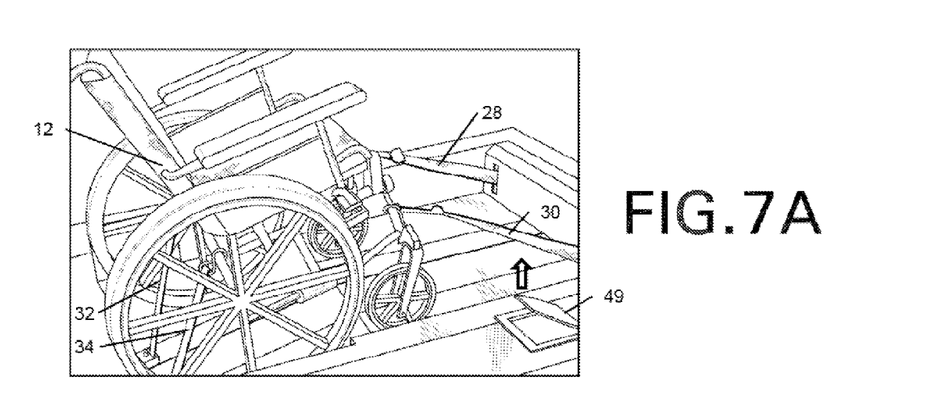
FIGS. 7A-7C illustrate the steps for removing a wheelchair after it has been secured in the securement area as shown in FIG. 6D.
Figure 7B:
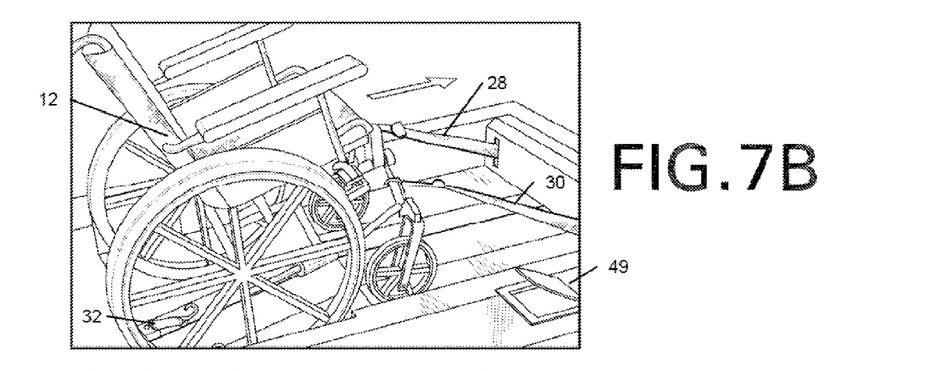
Figure 7C:
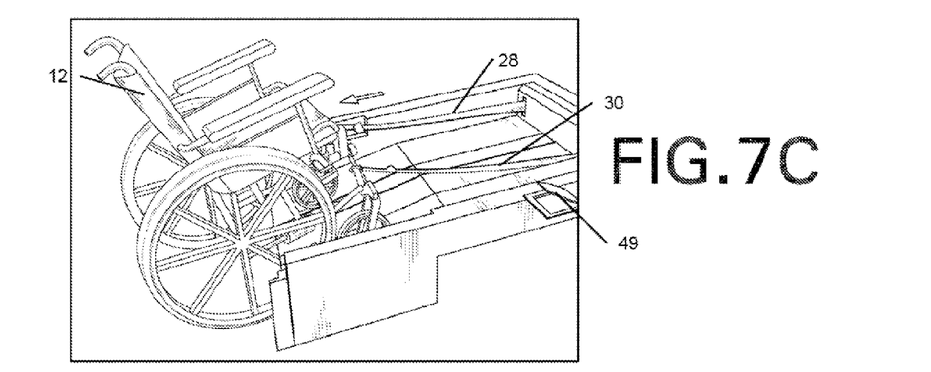

FIGS. 7A-7C illustrate the steps for removing a secured wheelchair 12 from the system 10, for example, after a trip has been taken and a destination reached. As shown in FIG. 7A, the wheelchair 12 is secured to the inside surface of the vehicle 14 by way of restraints 28, 30, 32, and 34. In FIG. 7A, the release of the locking of the retractors is achieved by pulling upon the toggle 4. The unlocking of the restraints is sequenced for safety. In particular, the rear restraints 32 and 34 are provided with sensors that sense the condition of the restraints (i.e., whether it is in an extended/secured condition or a retracted/unsecured condition). In the case of FIG. 7A, the sensors for the rear restraints would indicate to the restraint system 44 that the rear restraints 32 and 34 are secured to the wheel chair 12. Thus, pulling toggle 49 causes the restraint system to maintain the front restraints 28 and 30 in their locked states, but allows the rear restraints 32 and 34 to move to their unlocked states. This prevents the vehicle operator from pulling the wheelchair out of the vehicle while the rear restraints 32 and 34 are secured to the wheelchair, an act that could result in the wheelchair tipping backwards down the vehicle ramp. Once the rear restraints 32 and 34 are in their fully retracted position, a sensor on the rear retractors sends a signal to the controller 47 that will allow the front retractors to unlock. As an additional safety feature, the front retractors 32 and 34 will only become free to unwind after some slack has been provided and some winding of the spool of the retractor occurs, such as by pushing the wheelchair slightly forward. Only this slight push forward will fully unlock the front retractors 32 and 34, so that simply putting the rear retractors in their fully retracted condition will not, alone, allow unwinding of the front retractors 28 and 30. This is to ensure that unlocking of the front retractors does not occur while an operator is, for example on his or her knees unlocking the rear retractors, and ensures that the full unlocking of the front retractors occurs only when the operator is in full control of the wheelchair (hence the push-forward requirement to fully unlock the front retractors).

As such, the vehicle operator is forced to first disengage or disconnect the rear restraints 32 and 34 from the third and fourth wheelchair attachment points 40 and 42, respectively. At this point, the proximity sensors would sense that the rear of the wheelchair is unsecured, causing the restraint system 44 to place the front restraints 28 and 30 in their unlocked states. In FIG. 7C, the wheelchair 12 is then reversed out of the vehicle 14, and the front two restraints 28 and 30 are still engaged but in an unlocked mode. Only when the wheelchair is fully outside the securement area (See FIG. 6B) are the front retractors disengaged or disconnected from the wheelchair attachment points disposed near the front area of the wheelchair 12.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein. It should be understood that the arrangements described herein are for purposes of example only. As such, those skilled in the art will appreciate that other arrangements and other elements can be used instead, and some elements may be omitted altogether. Further, many of the elements may be implemented as discrete or distributed components or in conjunction with other components, in any suitable combination.

The invention claimed is:

1. A wheelchair securement system for securing a wheelchair to be secured in a wheelchair securement area for transit, the wheelchair securement system comprising:
a first restraint assembly and a second restraint assembly, each of which is anchored at a front end of the securement area and each of which is extendable from the front end of the securement area to points of attachment on the wheelchair to be secured;
the first restraint assembly adapted to connect to at least one point of attachment generally disposed at a front portion of the wheelchair to be secured;
the second restraint assembly being extendable to a guide at a rear end of the securement area, and extendable from the guide to at least one attachment point disposed at generally a rear portion of the wheelchair to be secured, whereby generally both a front portion and a rear portion of the wheelchair are secured by restraint assemblies anchored at a front end of the securement area.

2. The securement system of claim 1, wherein the wheelchair securement area is adapted to be disposed in a vehicle with the front end of the securement area generally corresponding to a front end of the vehicle, and the rear end of the securement area generally corresponding to a rear end of the vehicle, such that a front-to-back axis of the securement area is generally parallel with a front-to-back axis of the vehicle.

3. The securement system of claim 1, wherein the first restraint assembly comprises at least two front restraints, each of which is extendable to at least one attachment point disposed generally at a front portion of the wheelchair to be secured; and wherein the second restraint assembly comprises at least two rear restraints and two rear restraint guides, each rear restraint having one of said guides, each rear restraint being extendable to at least one wheelchair attachment point disposed generally at a rear portion of the wheelchair to be secured.

4. The securement system of claim 1, wherein the guide disposed near the rear end of the securement area is pivotable such that the second restraint assembly is capable of being directed by said guide in a plurality of directions whereby the second restraint assembly is capable of connecting to various points of attachment at rear portions of the wheelchair to be secured.

5. The securement system of claim 1, further comprising a channel through which portions of the second restraint assembly pass, the channel extending generally from the front end of the securement area to the guide.

6. The securement system of claim 5, wherein the channel has a cover generally forming an enclosure around said channel.

7. The securement system of claim 5, wherein the channel is recessed below a bottom surface of the securement area.

8. The securement system of claim 1, wherein the first restraint assembly includes at least one length of webbing, the length being greater than the distance between the front end of the securement area and the rear end of the securement area, and the first restraint assembly includes at least one retractor, said at least one retractor having a one-way-locking mode of operation whereby the refractor allows a wheelchair connected to the length of webbing to be moved in a direction of the securement area, and prevents inadvertent movement of the wheelchair away from the securement area unless the retractor is put into a different mode of operation.

9. The securement system of claim 1, wherein the first restraint assembly and the second restraint assembly each have at least one retractor, each retractor of each restraint assembly having webbing and a spool, and each of the at least one retractor having at least two modes, the at least two modes of each retractor including a free-winding mode in which the spool of the refractor is freely moveable in both a winding and an unwinding direction, the at least two modes of each retractor including a first mode in which each spool is unlocked and free to wind or unwind and a second mode in which each spool is free to wind, and is locked against unwinding.

10. The securement system of claim 9, wherein the first restraint assembly and second restraint assembly are remotely controlled by a controller that sequentially puts the retractors of said first and second restraint assemblies in their respective first modes each for a predetermined period of time, after which the retractors of said assemblies are switched to their respective second modes.

11. The securement system of claim 10, wherein said first restraint assembly includes the at least one retractor having an intermediate mode in which the spool of the at least one retractor of said first restraint assembly is prevented from unwinding and is capable of being switched to the first mode by allowing the spool of said at least one retractor to undergo movement in a winding direction and after which movement the at least one retractor is switched to said first mode, and retractors associated with securing rear portions of the wheelchair having sensors that detect when restraints thereof are substantially fully wound onto said retractors, said sensors sending a signal to a controller that allows retractors associated with front portions of the wheelchair to switch to an intermediate mode.

12. The securement system of claim 11, wherein the first restraint assembly includes a first retractor and a second retractor, each of said first and second retractors having a length of webbing and a spool, and each of the first and second retractors has a first, second and intermediate mode, the second restraint assembly including third and fourth retractors, each of the third and fourth retractors having a length of webbing and a spool, and the third and fourth retractors having first and second modes, the first, second, third and fourth retractors all being disposed in a housing, and the housing is disposed at the front end of the securement area;

a release mechanism being coupled to each of the first, second, third, and fourth retractors such that the release mechanism is adapted to change the mode of the first, second, third, and fourth retractors from one of said modes to another of said modes for a predetermined period of time.

13. The securement system of claim 12, wherein the release mechanism is coupled to said retractors by a connection selected from the group consisting of: a mechanical connection, an electrical connection, a pneumatic connection, and a wireless connection;

and the material comprising the length of webbing is selected from the group consisting of webbing, cable and rope.

14. A wheelchair securement system for securing a wheelchair to be secured in a wheelchair securement area for transit, the wheelchair securement system comprising:

a first restraint assembly and a second restraint assembly, each of which is anchored at a front end of the securement area and each of which is extendable from the front end of the securement area to points of attachment on the wheelchair to be secured;

the first restraint assembly adapted to connect to at least one point of attachment generally disposed at a front portion of the wheelchair to be secured;

the second restraint assembly being extendable to a guide at a rear end of the securement area, and extendable from the guide to at least one attachment point disposed at generally a rear portion of the wheelchair to be secured, whereby generally both a front portion and a rear portion of the wheelchair are secured by restraint assemblies anchored at a front end of the securement area;

the first restraint assembly and the second restraint assembly each having at least one retractor, each retractor of each restraint assembly having a spool, and each of the at least one retractor having at least two modes, the at least two modes of each retractor including a free-winding mode in which the spool of the refractor is freely moveable in both a winding and an unwinding direction, the at least two modes of each retractor including a first mode in which each spool is unlocked and free to wind or unwind and a second mode in which each spool is free to wind, and is locked against unwinding;

the first restraint assembly and second restraint assembly being controlled by a controller that is operable to sequentially put the retractors of said first and second restraint assemblies in their respective first modes each for a limited predetermined period of time, after which the retractors of said assemblies are switched to their respective second modes;

the first restraint assembly including the at least one retractor having an intermediate mode in which the spool of the at least one retractor of said first restraint assembly is prevented from unwinding and is capable of being switched to the first mode by allowing the spool of said retractor to undergo movement in a winding direction and after which movement the retractor is switched to said first mode, and restraints associated with securing rear portions of the wheelchair having sensors that detect when the restraints are substantially in fully retracted positions, said sensors sending a signal to a controller that allows retractors associated with front portions of the wheelchair to switch to an intermediate mode.

15. The wheelchair securement system of claim 1 further comprising a securement housing, the securement housing being defined by a frame and a cover, wherein the securement housing is mounted at the front end of the securement area by the frame and wherein the first restraint assembly and the second restraint assembly are secured to the frame.

16. The wheelchair securement system of claim 1 wherein the front end is defined by a front wall and the first restraint assembly and the second restraint assembly are attached to the front wall.

17. The wheelchair securement system of claim 14 further comprising a securement housing, the securement housing being defined by a frame and a cover, wherein the securement housing is mounted at the front end of the securement area by the frame and wherein the first restraint assembly and the second restraint assembly are secured to the frame.

18. The wheelchair securement system of claim 14 wherein the front end is defined by a front wall and the first restraint assembly and the second restraint assembly are attached to the front wall.

* * * * *